(12) United States Patent
Giacomel

(10) Patent No.: US 6,742,580 B1
(45) Date of Patent: Jun. 1, 2004

(54) FOOD PREPARATION AND STORAGE DEVICE

(76) Inventor: Jeffrey A. Giacomel, 1909 Chasewood Cir., Suite 211, Arlington, TX (US) 76011

( * ) Notice: Subject to any disclaimer, the term of this patent is extended or adjusted under 35 U.S.C. 154(b) by 234 days.

(21) Appl. No.: 09/604,357

(22) Filed: Jun. 27, 2000

Related U.S. Application Data

(63) Continuation of application No. 08/919,526, filed on Aug. 28, 1997, now Pat. No. 6,109,345.

(51) Int. Cl.⁷ .................................................. A23L 1/48
(52) U.S. Cl. ........................ 165/185; 165/11.1; 426/521; 426/524
(58) Field of Search ............................. 165/185, 11.1; 99/419, 517; 426/523, 524; 294/106

(56) References Cited

U.S. PATENT DOCUMENTS

| | | | |
|---|---|---|---|
| 1,348,059 A | 7/1920 | Sheppard | 294/106 |
| 1,808,617 A | 6/1931 | Thompson | 165/185 X |
| 1,817,978 A | 8/1931 | Feldmeier | 165/74 |
| 2,100,080 A | 11/1937 | Lackinger | 294/106 |
| 2,325,647 A | 8/1943 | Adamson | 165/185 X |
| 2,404,166 A * | 7/1946 | Danilla | 165/67 |
| 2,688,467 A | 9/1954 | Leatzow | 165/185 X |
| 2,835,480 A | 7/1958 | Perez | 165/104.21 |
| 3,996,847 A * | 12/1976 | Reed | 99/419 |
| 4,194,015 A * | 3/1980 | Colato | 426/233 |
| D259,010 S | 4/1981 | Klatt | D7/504 |
| D282,137 S | 1/1986 | Williams et al. | D7/637 |
| 4,745,968 A | 5/1988 | Demos | 165/185 |
| 4,785,875 A | 11/1988 | Meijer et al. | 165/104.25 |
| 5,014,776 A | 5/1991 | Hess | 165/185 |
| 5,129,451 A | 7/1992 | Moir et al. | 165/185 |
| 5,461,867 A | 10/1995 | Scudder et al. | 62/4 |
| D378,979 S | 4/1997 | Clubb | D7/673 |
| 5,787,976 A | 8/1998 | Hamburgen et al. | 165/185 |
| 5,848,637 A * | 12/1998 | Lee | 165/104.21 |
| 5,875,834 A | 3/1999 | Brooks | 165/11.1 |
| D408,692 S | 4/1999 | Tisdale | D7/638 |
| 5,907,989 A | 6/1999 | Sie et al. | 83/762 |
| D412,268 S | 7/1999 | Uemura | D7/673 |
| 6,109,345 A | 8/2000 | Giacomel | 165/185 |

FOREIGN PATENT DOCUMENTS

| | | |
|---|---|---|
| DE | 2 027 527 A | 12/1970 |
| DE | 32 14 886 A | 10/1983 |
| FR | 445563 A | 11/1912 |
| FR | 1.586.050 A | 2/1970 |
| FR | 2 575 814 A | 7/1986 |
| GB | 1275846 | 5/1972 |
| JP | 08-322530 | 10/1996 |
| RU | WO 90/14771 | 12/1990 |
| WO | WO 99/10691 | 3/1999 |

OTHER PUBLICATIONS

Patent Abstracts of Japan: vol. 097 No. 004, Apr. 30, 1997 JP 08 322530A Hoshizaki Electric Co.
All QA Products, Inc. catalog, Gainesville, FL., p. 11.

* cited by examiner

*Primary Examiner*—Allen Flanigan
(74) *Attorney, Agent, or Firm*—Thompson & Gustavson, L.L.P.

(57) ABSTRACT

A food storage and preparation device (10, 50, 100, 200) is provided for more rapidly cooling or heating a mass of food or other product contained within a storage pan. The device includes a plurality of air contact fins (20) which rapidly convey heat to and from the ambient surrounding air and a plurality of food contact fins (22, 56, 106) which are inserted within the mass of food to increase the surface area of the food exposed to a heat transfer surface to more rapidly transfer heat to or from the mass of food.

15 Claims, 11 Drawing Sheets

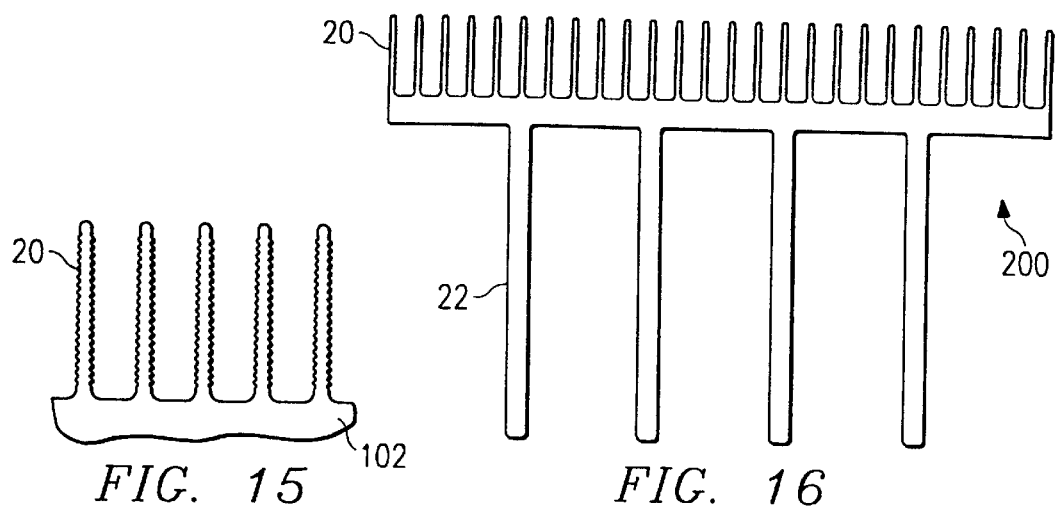
FIG. 15
FIG. 16
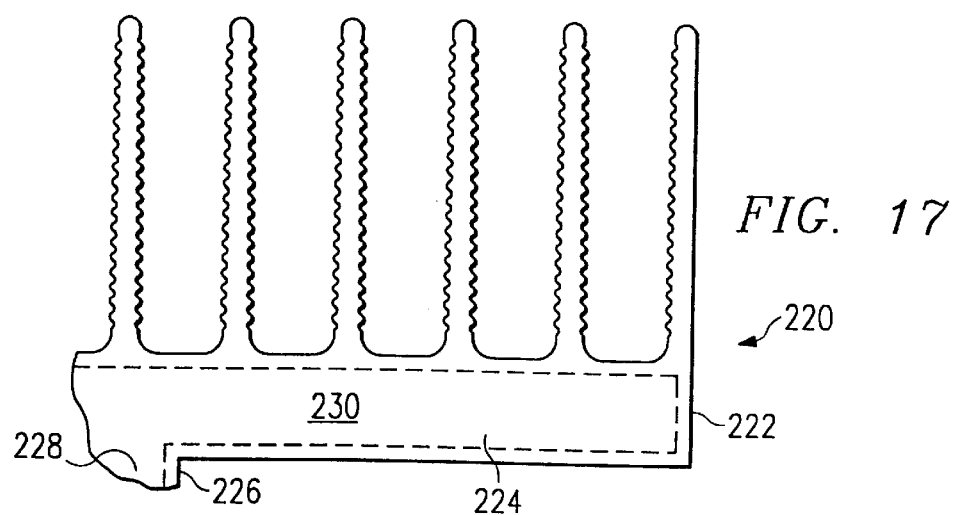
FIG. 17
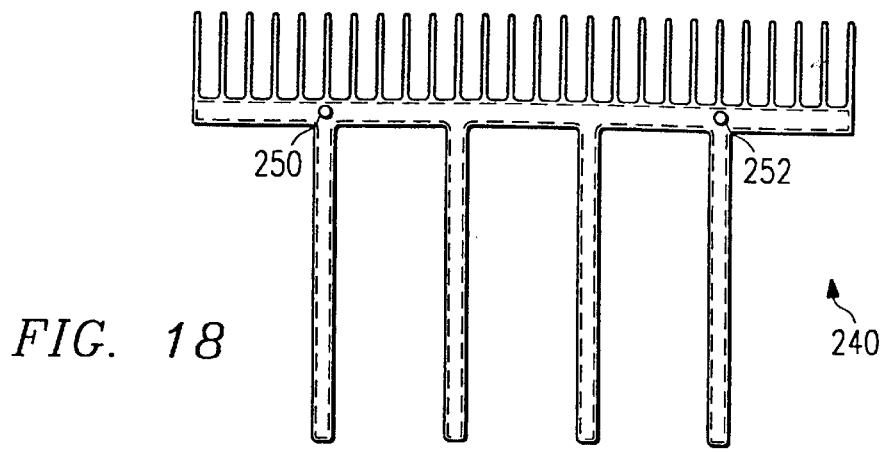
FIG. 18

FOOD PREPARATION AND STORAGE DEVICE

This application is a continuation of Ser. No. 08/919,526 filed Aug. 28, 1997 now U.S. Pat. No. 6,109,345.

TECHNICAL FIELD OF THE INVENTION

This invention relates to the preparation and storage of food and other materials of a commercial and industrial nature such as cosmetics, pharmaceuticals and other organic and inorganic materials, and in particular to a device for rapidly cooling and heating food.

BACKGROUND OF THE INVENTION

In the food preparation industry, the rapid cooling or heating of food is very critical. For example, when a large batch of food is prepared, for example, a stew, beans or the like, health food regulations, and safety requires the food to be cooled within a certain time period from the cooking temperature, (perhaps 140–165° F.) to the storage temperature of 40° F. The longer the food takes to cool, the longer the food will be at a temperature range conducive to the growth of harmful bacteria and the like which can spoil the food and cause illness.

The commercial food industry, for example, will often use manual labor to take large volumes of hot food and place them in plastic bags for protection and submerge the bags and food in ice baths to cool the food from the cooking temperature to the storage temperature. This is a very costly procedure given the energy and labor input that is required each time the procedure is undertaken. In addition, the bags are used to subsequently reheat the food. This process of using bags involves physically handling the food at each bag iteration. It often takes more than a four hour period to cool the food from the cooking temperature to the storage temperature. In addition to the bags and the ice baths, quite often the food is broken down into smaller pans to facilitate cooling. Again, this results in a waste of labor, energy and food and results in an increased possibility of cross-contamination. Many jurisdictions have regulations that limit the time for this cooling procedure and this must be monitored continuously.

In heating the food just before serving, time is also critical. It is desirable to keep this time as short as possible to give the preparer greater flexibility in the timing of the final meal service. Further, the shorter the interval of time to heat the food, the less time the food will be exposed to a temperature range conducive to the growth of bacteria. Also, less energy is required to heat the product to temperature and less product is lost to burning or dehydration at the edges nearest the heat source due to non-uniform heating of the product.

A need exists for a process to more rapidly heat and cool food to provide the advantages of a safer food service and to satisfy the applicable regulations, reduce energy, labor and product loss due to inefficient thermal effects.

SUMMARY OF THE INVENTION

In accordance with one aspect of the present invention, an apparatus is provided for rapidly changing the temperature of a mass of product. The apparatus includes at least one input heat transfer element extending into the mass of product and at least one output heat transfer element exposed to an ambient temperature environment to transfer thermal energy between the input heat transfer element and the output heat transfer element.

In accordance with another aspect of the present invention, the apparatus is employed with a pan containing the mass of product. A lid is provided for the pan which has a plurality of slots therein. The apparatus includes a plurality of input heat transfer elements formed as fins, the fins extending through the slots in the lid and into the mass of product therein. The output heat transfer element is positioned exterior the lid. In accordance with another aspect of the present invention, the fins can be removable. The fins also can touch the bottom of the pan to enhance heat transfer.

The input heat transfer elements can extend from the top of the pan down, from the bottom of the pan upward, or horizontally from the sides.

The apparatus may be integral with the top closure of the pan or may be used with an expandable handle to facilitate removal of the apparatus from the pan.

Heat transfer can occur by conduction, convection and radiation.

A working heat transfer medium, either a solid, liquid or gas, can be utilized to improve the heat transfer.

BRIEF DESCRIPTION OF THE DRAWINGS

A more complete understanding of the invention and its advantages will be apparent from the following detailed description, when taken in conjunction with the accompanying drawings, in which:

FIG. 15 is a detail view of the fins of the device of FIG. 11;

FIG. 16 is an end view of a device cast, extruded, molded or machined as a unitary body;

FIG. 17 is a detailed view of a device having a hollow body and fins containing a thermal transfer medium with thermal characteristics offering a high thermal capacitance and heat transfer rate;

FIG. 18 is an end view of a device having hollow fins and body and inlet and outlet ports for passage of a coolant;

DETAILED DESCRIPTION OF THE INVENTION

Figure 1A:
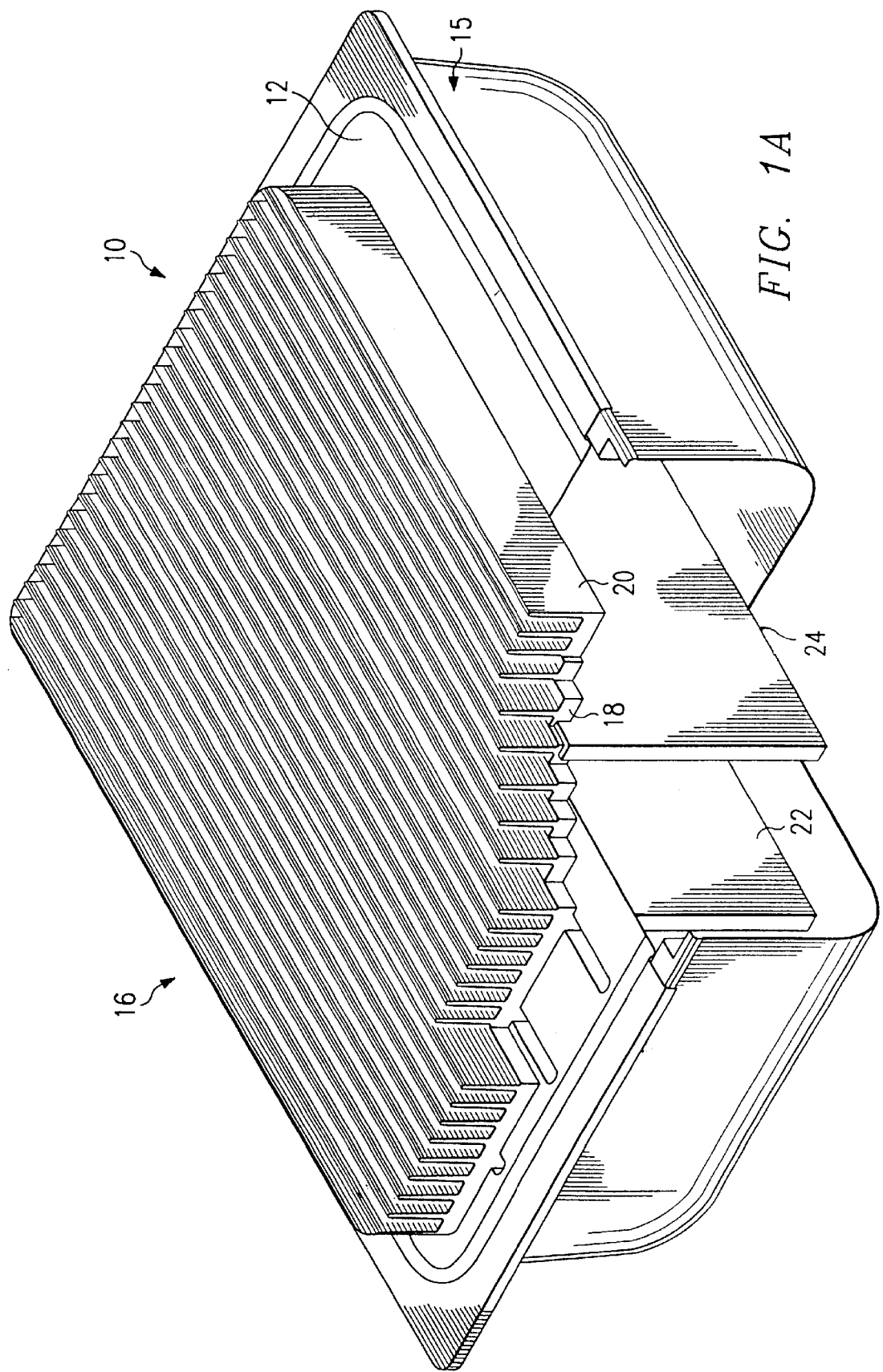
FIG. 1A is a perspective view of a food preparation and storage device forming a first embodiment of the present invention.
Figure 1B:
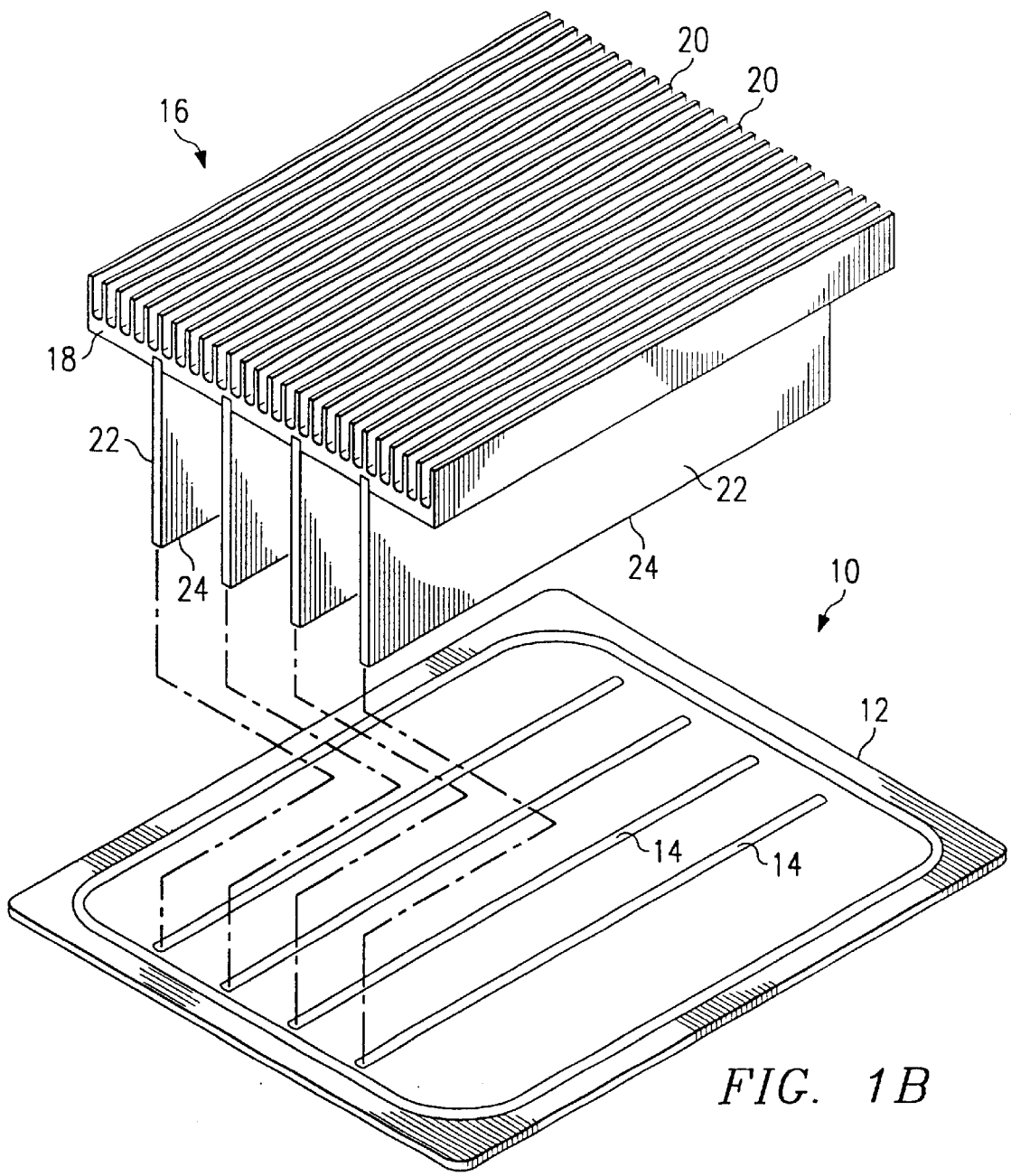
FIG. 1B is an exploded perspective view of the food preparation and storage device.
Figure 2:
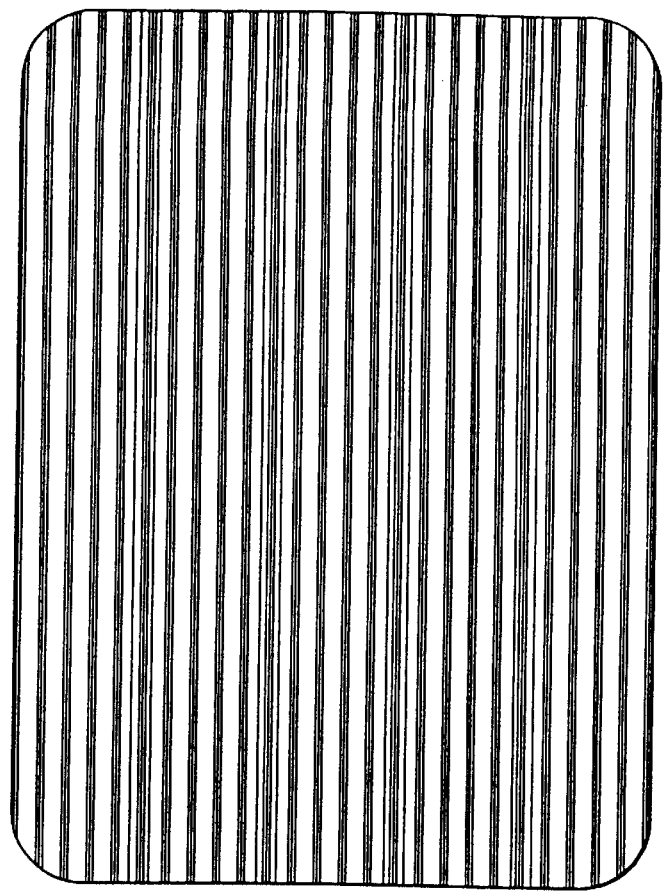
FIG. 2 is a plan view of the device of FIG. 1.
Figure 3:
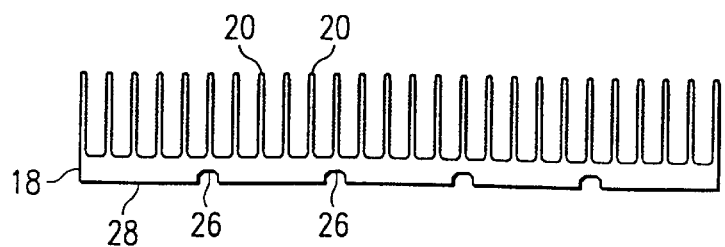
FIG. 3 is an end view of the upper portion of the device of FIG. 1.
Figure 4:
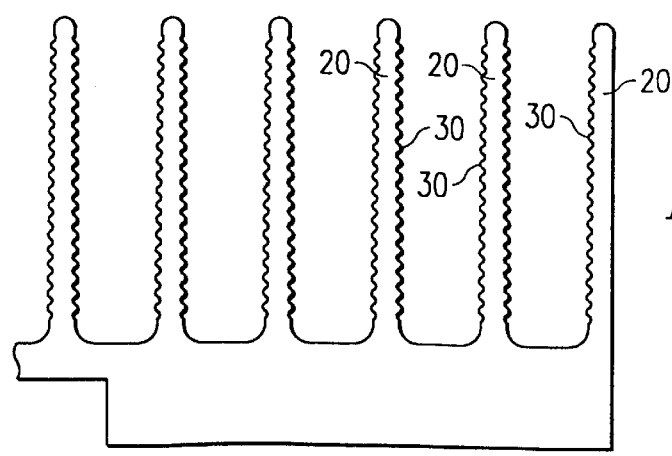
FIG. 4 is a detail view of the exposed heat transfer fins of the device.

With reference now to the figures, and in particular to FIGS. 1A–6, there is shown a food storage and preparation device 10 forming a first embodiment of the present invention. The device 10 is intended to be used with a food preparation and storage pan 15 as is commonly used in the food service industry. For example, typical pans of this type might have horizontal dimensions of nine inches by twelve inches and a depth of about six inches. As will be described hereinafter, device 10 not only can provide a lid for the container, but also provides for rapid cooling and heating of the food within the pan.

The device 10 can include a lid 12 which has a series of linear slots therethrough. The lid 12 is designed to fit commonly used pan designs found in the food industry today. In addition, the device 10 includes a heat transfer assembly 16 which includes a body 18 forming a plurality of air contact fins 20 and a plurality of food contact fins 22. The food contact fins 22 are positioned on the body 18 to fit through slots 14 in the lid 12 and enter the mass of food or other product within the pan 15 on which the lid is positioned. If desired, the bottom edges 24 of the food contact fins 22 can contact the bottom of the pan.

The heat transfer assembly 16 is preferably formed of a material having a high coefficient of thermal conductivity. For example, the assembly 16 and lid 12 can be made of aluminum, stainless steel, cast iron, copper, high thermally conductive plastics, polymers, polyimides, organic or inorganic structures, or other suitable material. The material can be sandwiched or coated or a combination thereof provided that the heat transfer capability is satisfactory utilizing the preferred heat transfer characteristics of solid, liquid or gas.

As can be appreciated, the assembly 16 provides for more rapid heat transfer between the mass of food within the pan and the surrounding ambient air. When the mass of food is being cooled from the cooking temperature to the storage temperature, typically 40° F., the intimate contact between the mass of food and the plurality of food contact fins 22 provides for enhanced heat transfer from the food mass into the assembly 16. The heat transfer is rapid from the food contact fins 22 into the body 18 and air contact fins 20, where the heat is rapidly dissipated by heat transfer to the ambient air. Similarly, when the food is to be heated, such as by positioning the pan and assembly 16 in an oven, the ambient air temperature and incident radiation will rapidly heat the air contact fins 20, conveying heat to the body 18 and food contact fins 22. Because of the intimate contact between the mass of food and the food contact fins 22, the heat is more rapidly transferred into the mass of food than is possible without the use of the assembly 16.

Figure 5:
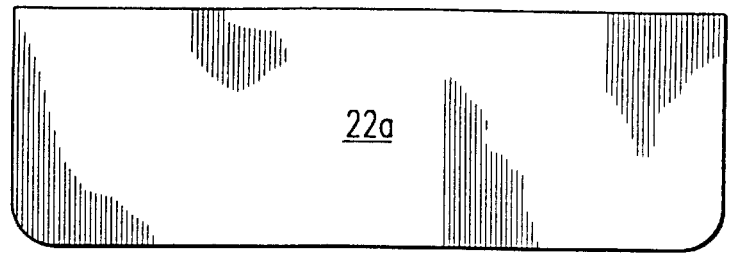
FIG. 5 is a side view of one of the fins used in the lower end of the device.
Figure 6:
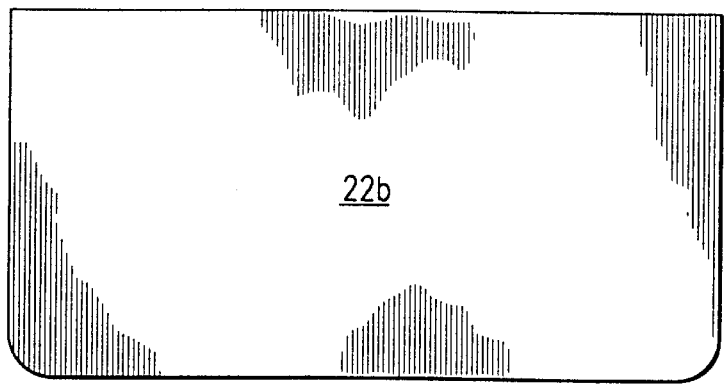
FIG. 6 is a side view of a modified fin used in the device.
Figure 7:
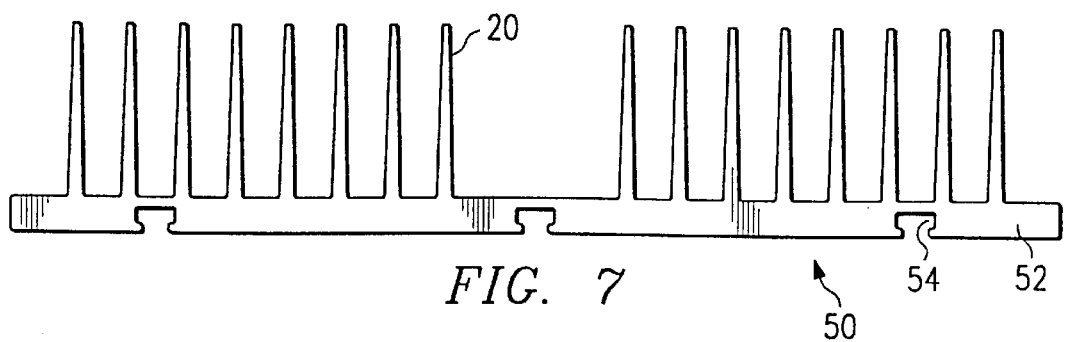
FIG. 7 is an end view of a device forming a first modification of the device shown in FIG. 1.
Figure 8:
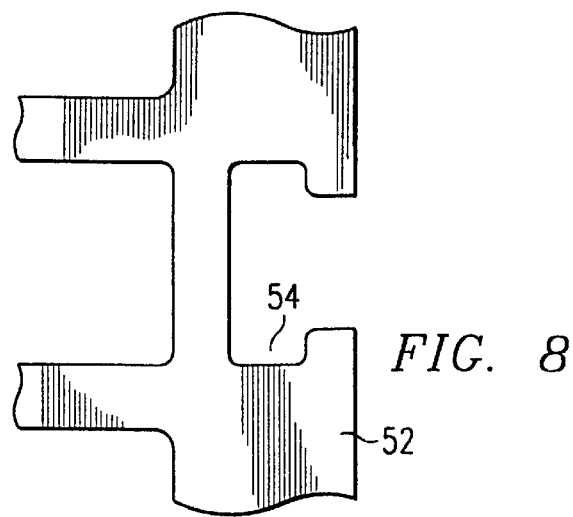
FIG. 8 is a detail view of the device of FIG. 7.
Figure 9:
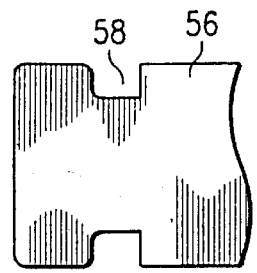
FIG. 9 is a detail view of a fin used in the device of FIG. 7.
Figure 10:
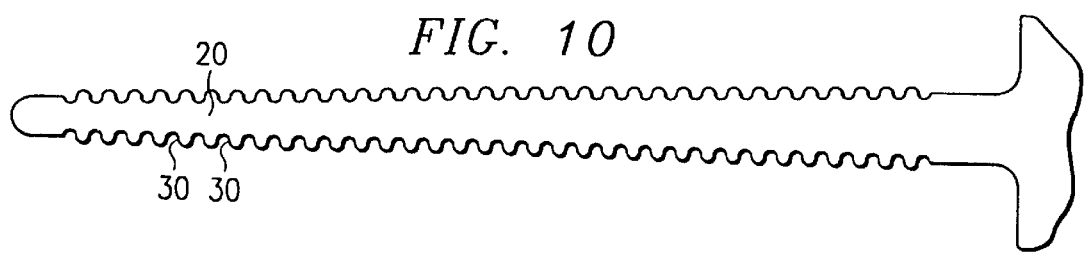
FIG. 10 is a detail view of a cooling fin used in the device of FIG. 7.
Figure 11:
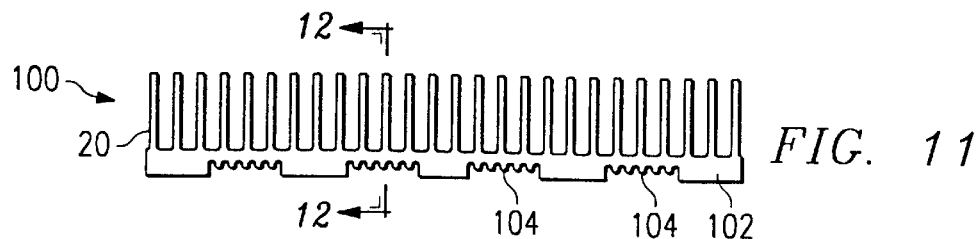
FIG. 11 is an end view of a second modification of the device of FIG. 1.

Among its many advantages, the device 10 will allow the cooling and heating rates of prepared foods to be shortened significantly. This will also extend food shelf life and increase storage. The device will improve performance within the health code guidelines and open the storage performance envelope in terms of storage and preparation time. Health and handling hazards are reduced and the handling appropriation costs of the food are reduced. Because the food industry has for years been in the process of standardization of pans, cooking apparatus and refrigeration for food storage, the present device, which is readily adaptable to present designs, reduces additional costs to a minimum. Other industrial and commercial applications of device 10 in such areas as cosmetics or pharmaceuticals would only require the scaling up or down in size of the device along the design parameters of the invention. The device 10 is also passive in the performance of its function, requiring a minimum of human interaction and thereby limiting the cross-contamination of the product. As seen in FIGS. 5 and 6, shorter food contact fins 22a can be used for shallower pans while deeper food contact fins 22b can be used for deeper pans. The fins 22 fit within slots 26 (FIG. 3) formed in the bottom surface 28 of the body 18 which allow different size fins to be mounted on a single design of body 18. The fins 22 can be welded, brazed, bonded, soldered, pinned, or otherwise attached to the body 18. The attachment can be permanent or removable. The air contact fins 20 are preferably formed integral with body 18 and also preferably are formed of a corrugated shape (FIG. 4) having a number of curved indentations 30 to increase the amount of surface area to enhance the heat transfer capability of the fins 20 to the ambient air.

Clearly, other configurations of device 10 can be utilized. The heat transfer assembly 16 can be used without lid 12, if desired. Further, the configuration, size and number of fins 20 and 22 can be varied as desired. Fundamentally, it is desired to have as much surface area contact between food contact fins 22 and the mass of food as is necessary to perform the desired heating or cooling function and to have sufficient surface area of air contact fins 20 to provide the desired rate of heat transfer between the ambient air and the fins 20. This device allows for variation in the size, quantity, geometry and orientation of the heat transfer members to maximize performance along the principles enumerated herein. The modular concept allows for the switching out of either the top finned segment or the entire device for a pre-frozen replacement to further facilitate the cooling of the product. The device 10 can be integral with the lid 12, or integral with the pan 15. For example, fins 22 can extend upward from the bottom of pan 15, or horizontally from the sides of pan 15.

A number of approaches to the device 10 can be taken. The device 10 can be multi-sectional, involving separable modular components which allows the addition or removal of heat transfer elements based on the desired end use and size of the pan. A two-piece design with lid can be utilized. A single unit involving a continuous extrusion of the fined assembly can also be made which would then be cut to the desired length. Preferably, the fins would be coated with an FDA approved coating, such as provided by General Magnaplate, to facilitate cleaning and meeting food handling requirements.

FIGS. 24, 25, 27, 28, 30 and 31 illustrate the cooling of refried beans using the device 10. It will be noted that the beans are at storage temperature within about two to three hours, rather than the up to twenty-four hours typically taken at the present time without use of the device 10 when done in a walk-in cooler with the same size pan.

Figure 24:
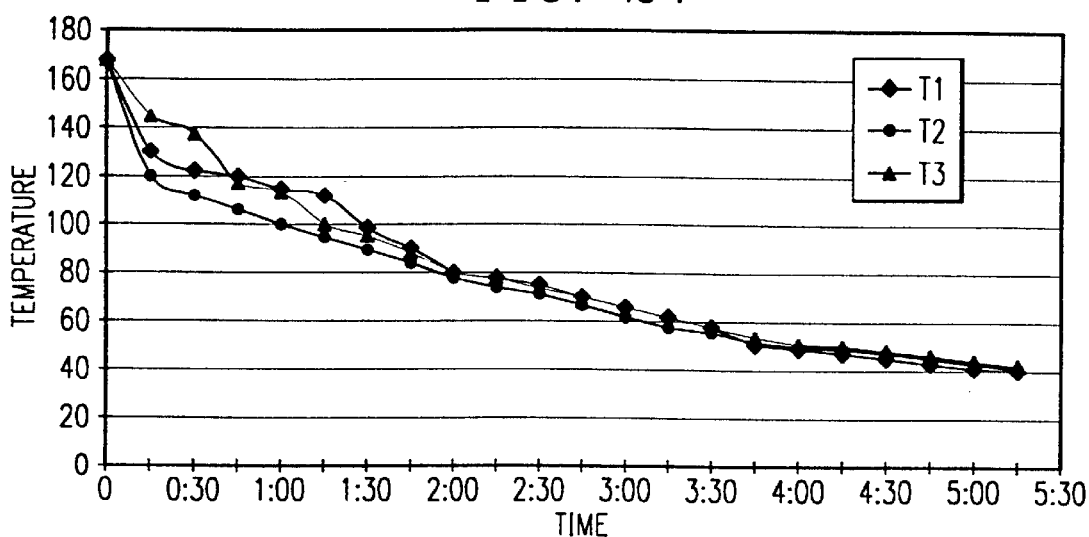
FIG. 24 is a graph of a freezer test with 17.5 pounds of refried beans in a 20° F. residential freezer unit.
Figure 25:
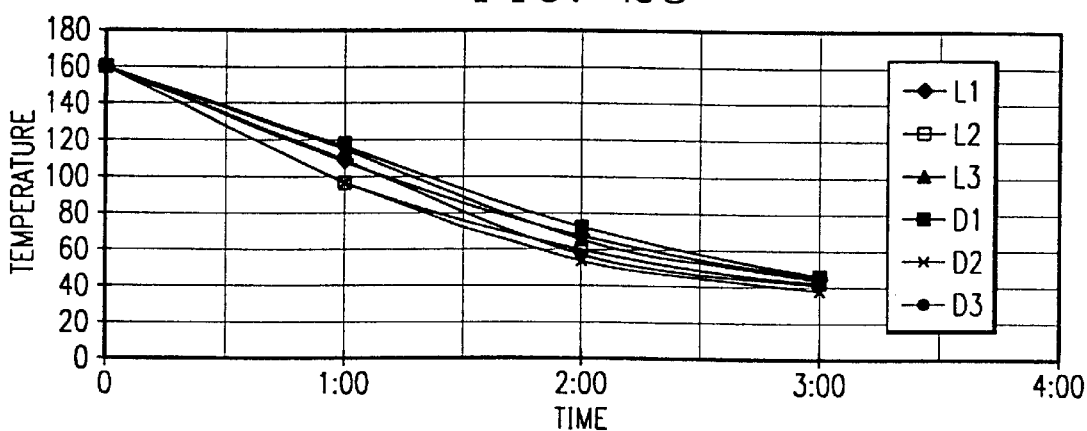
FIG. 25 is a graph of a freezer test for 17.5 pounds of refried beans in a 20° F. industrial freezer unit.
Figure 27:
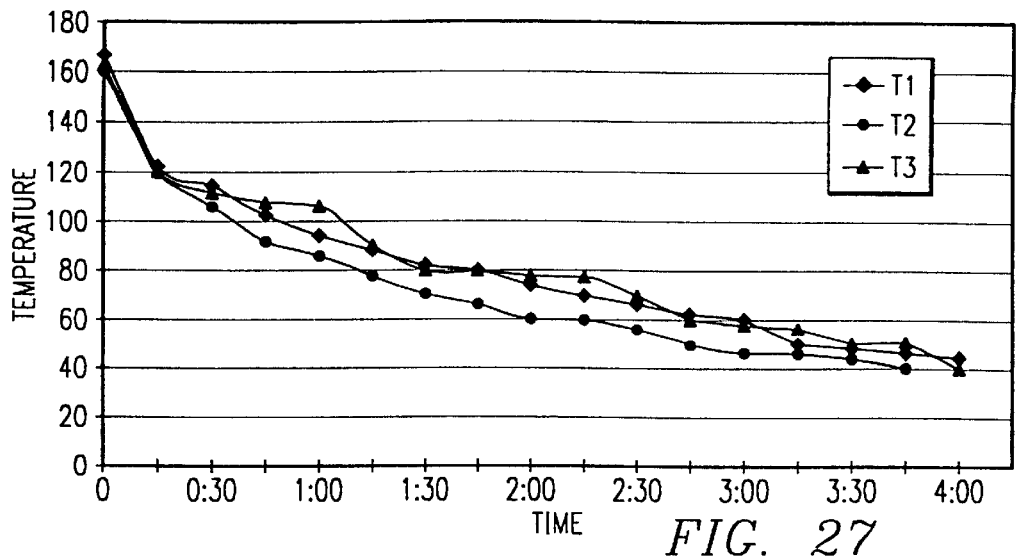
FIG. 27 is a graph of a cooling test for 17.5 pounds of refried beans in a pan using the device of FIG. 1A in a walk-in industrial refrigeration unit at 40° F.
Figure 28:
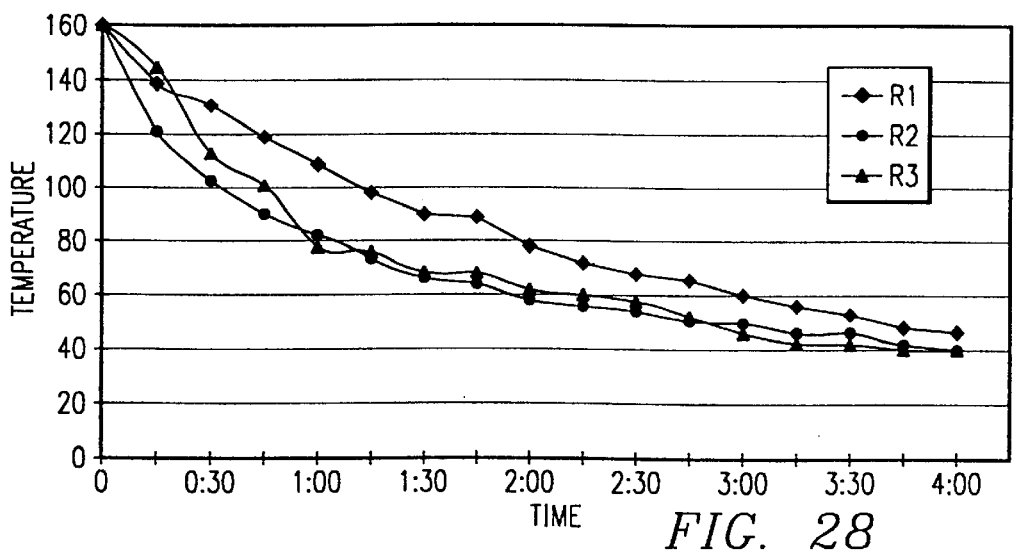
FIG. 28 is a graph of a cooling test for 17.5 pounds of refried beans in a pan using the device of FIG. 1A cooled in a walk-in industrial refrigerator unit at 40° F.
Figure 30:
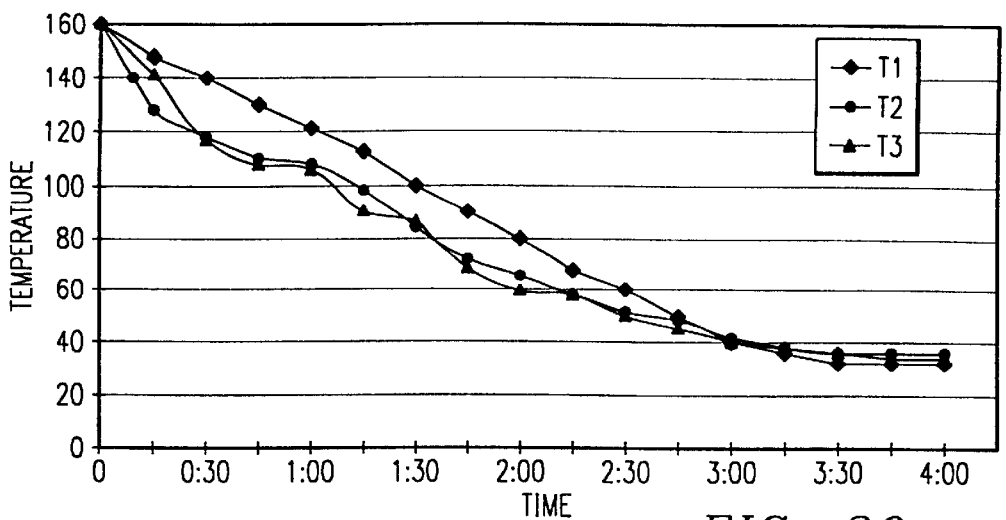
FIG. 30 is a cooling test of 17.5 pounds of refried beans in a pan utilizing the device of FIG. 1A in an industrial freezer at 20° F.
Figure 31:
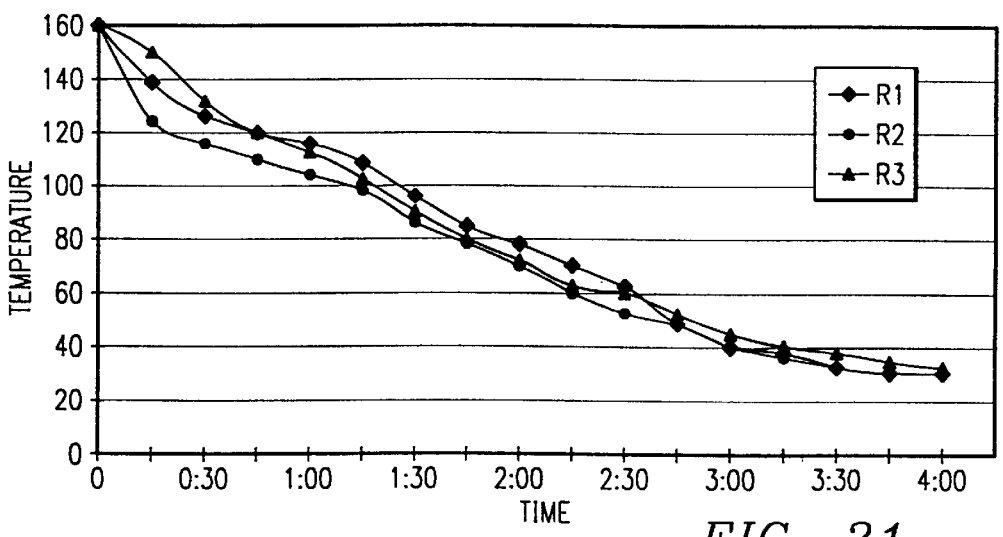
FIG. 31 is a graph of a cooling test for 17.5 pounds of refried beans in a pan utilizing the device of FIG. 1A in an industrial freezer unit at 20° F.

FIGS. 24 and 25 show results for 17.5 pounds of refried beans in one pan using device 10 cooled in a 20° F. residential freezer unit. FIGS. 27 and 28 show results for 17.5 pounds in one pan using device 10 of refried beans cooled in an industrial walk-in cooler at 40° F. FIGS. 30 and 31 show results for 17.5 pounds of refried beans in one pan using device 10 cooled in an industrial freezer at 20° F.

Figure 26:
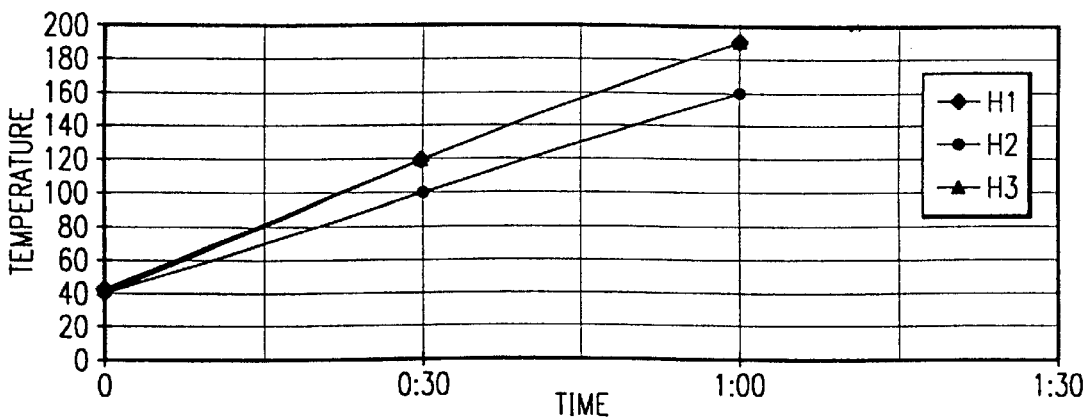
FIG. 26 is a reheat test of 17.5 pounds of refried beans in a 450° F. industrial unit utilizing the device of FIG. 1A.
Figure 29:
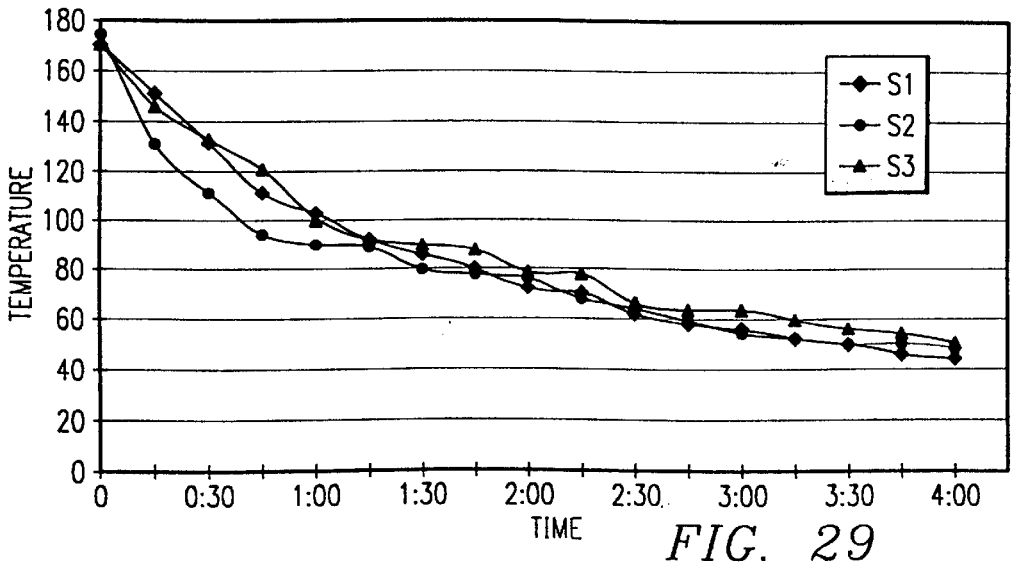
FIG. 29 is a graph of a cooling test for 19.2 pounds of spaghetti sauce in a pan utilizing the device of FIG. 1A in a walk-in industrial refrigerator at 40° F.
Figure 32:
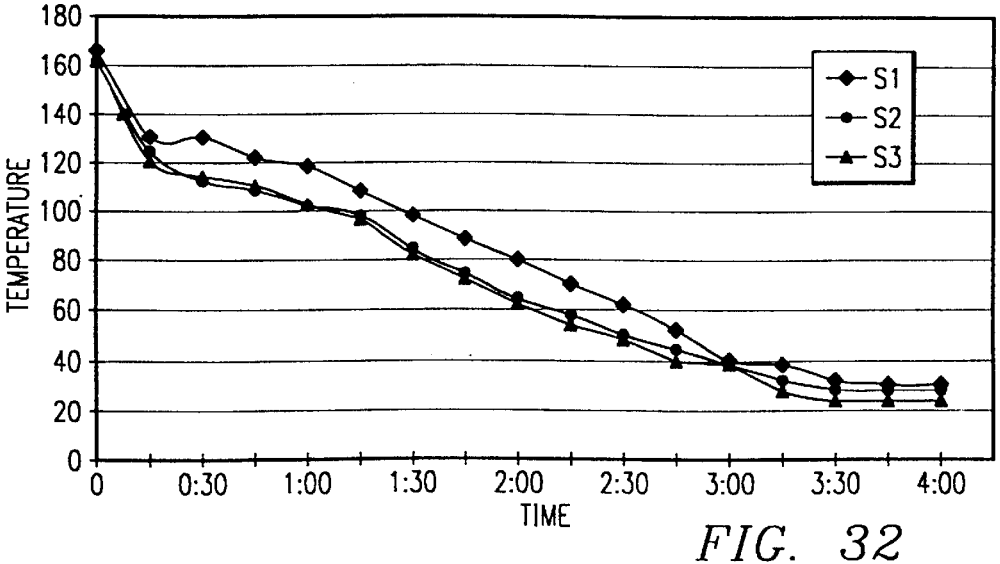
FIG. 32 is a graph of test results of a cooling test for 19.2 pounds of spaghetti sauce in a pan utilizing the device of FIG. 1A in an industrial freezer unit at 0° F.–20° F.

FIGS. 29 and 32 show various tests with spaghetti sauce by using device 10. In these tests, 19.2 pounds of sauce was placed in a pan using device 10. FIG. 29 is a test in a 40° F. industrial Unit and FIG. 32 is a test in a 0° F. to 20° F. industrial unit. FIG. 26 shows the advantage of reheating foods, such as beans, using device 10. The temperature of the beans rises more rapidly than otherwise would be possible to the serving temperature. FIG. 26 heated 17.5 pounds of refried beans in one pan using device 10 in a 450° F. industrial oven.

With reference now to FIGS. 7–10, a first modification of the invention is illustrated as food storage and preparation device 50. A number of elements of device 50 are the same as device 10 and are numbered with the same reference numerals. In device 50, a body 52 is provided which has dove-tail slots 54 therein for receiving the food contact fins 56. The fins 56, in turn, have dove-tail ends 58 which fit within the slots 54. If desired, the fit between fins 56 and body 52 can be a simple sliding fit to ease removal of the fins 56 from body 52 for easy cleaning.

Figure 12:
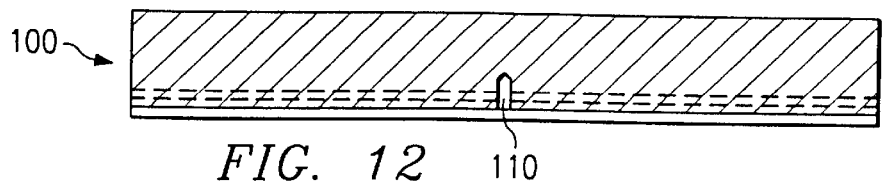
FIG. 12 is a cross-sectional view of FIG. 11 taken along line 12—12 in FIG. 11.
Figures 13A, 13B, 13C:
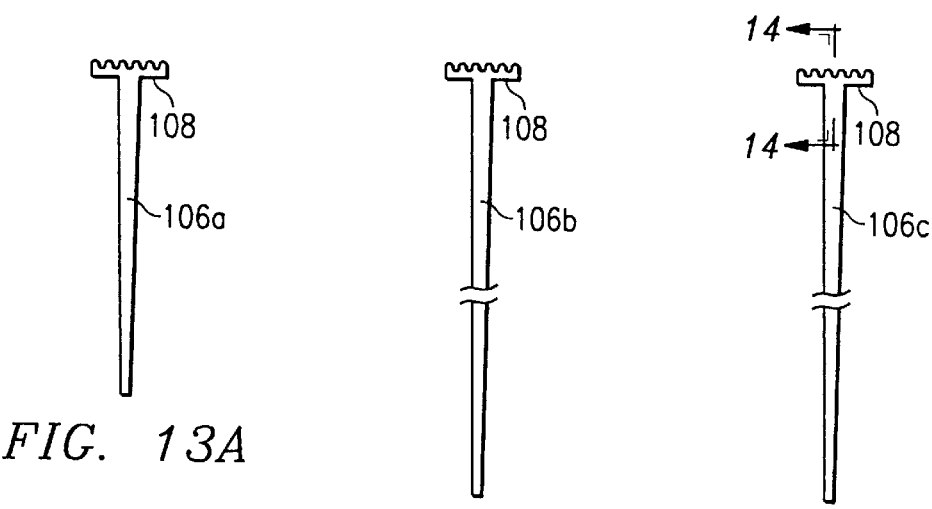
FIGS. 13A, B, C are fins used in the device of FIG. 11 of different lengths.
Figure 14:
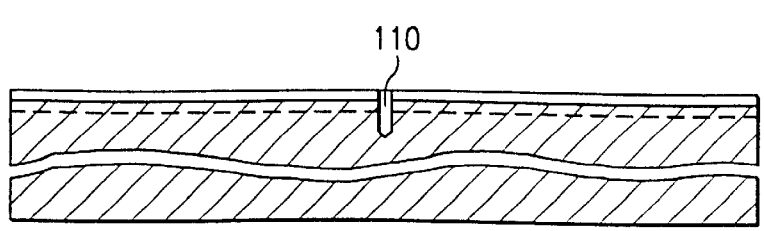
FIG. 14 is a cross-sectional view of the fin of FIG. 13C taken along line 14—14 in FIG. 13C.

With reference now to FIGS. 11–15, a food storage and preparation device 100 forming a second embodiment of the present invention is illustrated. Again, a number of elements of device 100 are the same as devices 10 and 50, and are identified by the same reference numeral. In device 100, the body 102 has a series of corrugated notches 104 to receive a food contact fin 106a, 106b or 106c. The fins 106a, 106b and 106c, in turn, have corrugated ends 108 to be received within the notches 104. As shown in FIGS. 13A–C, the fins 106a, 106b, and 106c can have varied lengths to adapt the device to a particular size pan, for example, 4 inches, 6 inches and 10 inches in length to fit pans with these depths. As can be seen in FIGS. 12 and 14, both the body 102 and fins 106a, 106b and 106c have pin apertures 110 to receive a pin therein to lock the fins 106 to the body 102. The modularity also enhances cleaning and handling characteristics.

FIG. 16 illustrates a device 200 which is formed as a unitary body which can be cast, extruded, molded or machined. In other regards, it is identical to device 10.

FIG. 17 illustrates a device 220 which is formed with a hollow body 222 containing cavity 224 and hollow food contact fins 226 defining cavities 228 along their length. Cavities 224 and 228 are connected and the cavities can contain a material 230 with high heat capacity and heat transfer rate. The material 230 can be a solid, liquid or gas and can be transformed from a solid to a liquid or gas during the heat transfer process.

Figure 19:
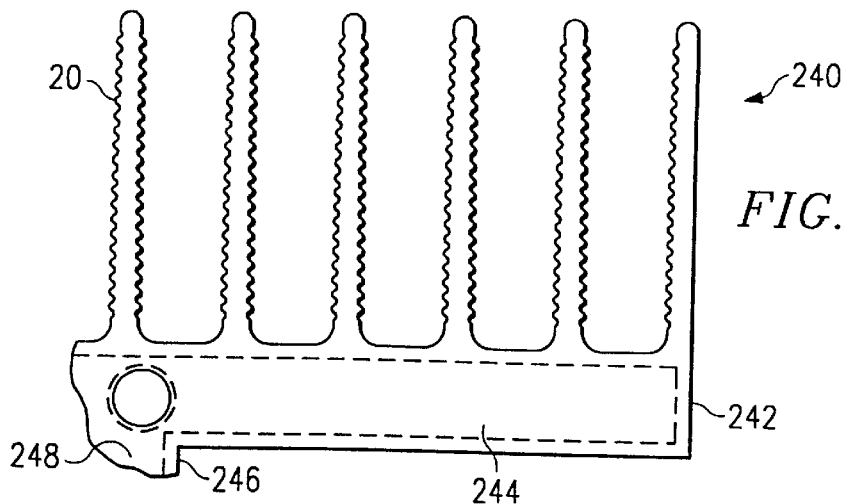
FIG. 19 is a detailed view of the device of FIG. 18.

FIGS. 18 and 19 illustrate a device 240 which has body 242 with cavity 244 and food contact fins 246 with cavities 248. Again, cavities 244 and 248 are connected. In addition, the body 242 has an inlet port 250 and an outlet port 252 opening through the exterior of the body into the cavity 244. The inlet port 250 can be connected to a source of heat transfer fluid, such as water or other liquid or gas material, which enters port 250 and flows through the cavities 244 and 248 absorbing heat. The heated fluid or gas is then removed from the outlet port 252 to a heat exchanger for reuse in the device 240 or disposed of. Device 240 permits variation of the heat transfer characteristics of the device by selecting a desired heat transfer fluid flow rate and type of material.

Figure 20:
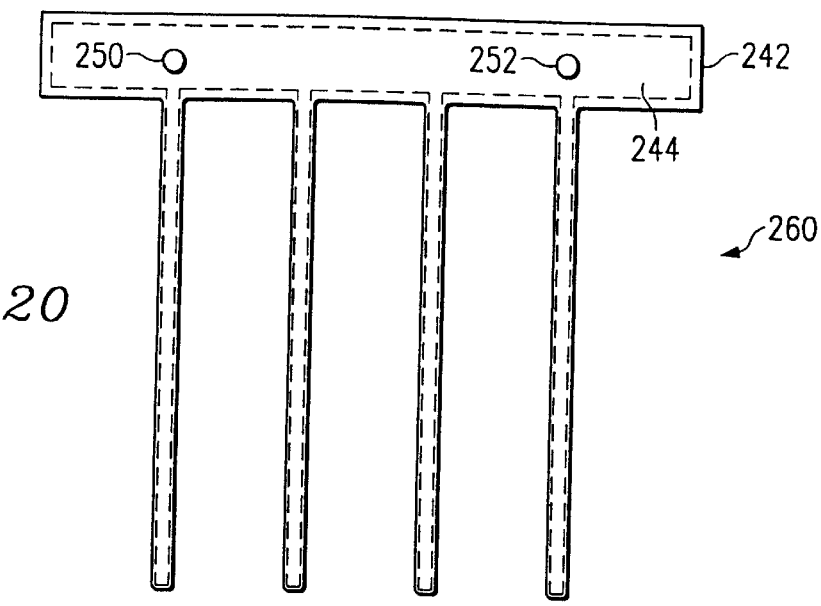
FIG. 20 is an end view of a device having a hollow body and fins with an inlet and outlet port for passage of coolant which does not use air cooled fins.

FIG. 20 illustrates a device 260 similar to device 240 in utilizing coolant flow therethrough. Because of the coolant flow, the air contact fins 20 are not utilized.

Figure 21:
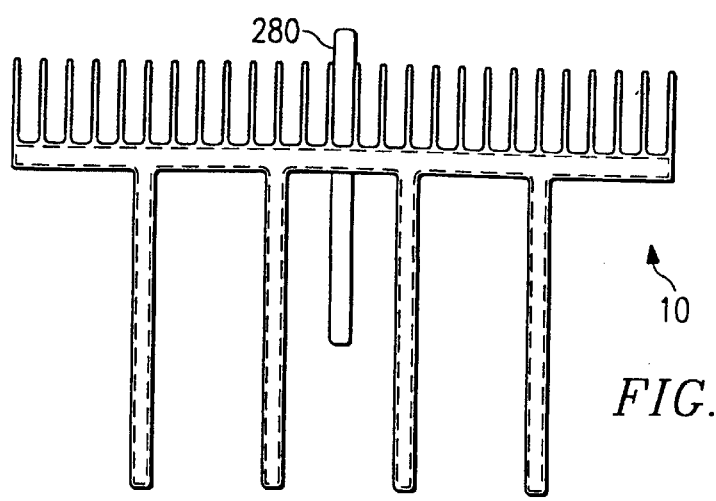
FIG. 21 is an end view of a device incorporating a temperature monitor.
Figure 22:
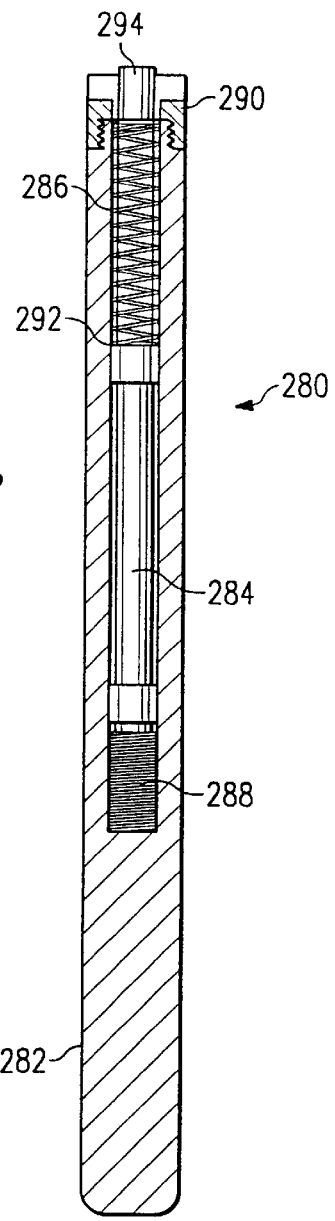
FIG. 22 is a cross-sectional view of the temperature monitor.

FIGS. 21 and 22 illustrate the use of a temperature monitor 280 in the device 10, but the monitor 280 can be used with any other device described herein. The temperature monitor gives a visual indication when a portion of the device or the material being heated or cooled has reached a certain temperature. With reference to FIG. 22, the monitor 280 can be seen to include a housing 282 into which is fit an indicating pin 284, a return spring 286 and a shape memory alloy spring 288. A cap 290 confines the pin and the springs within the housing 282. Below a determined temperature, the return spring acts between the cap 290 and ridge 292 on pin 284 to maintain the pin retracted within the housing. At the predetermined temperature, the shape memory alloy spring 288 increases in length, compressing the return spring 286, and urging end 294 of the pin 284 outside of the housing to provide a visual indication that the predetermined temperature has been achieved. For example, the temperature monitor 280 can be designed to actuate at about 140° F. or, to react when the temperature is about 40° F.

Figure 23:
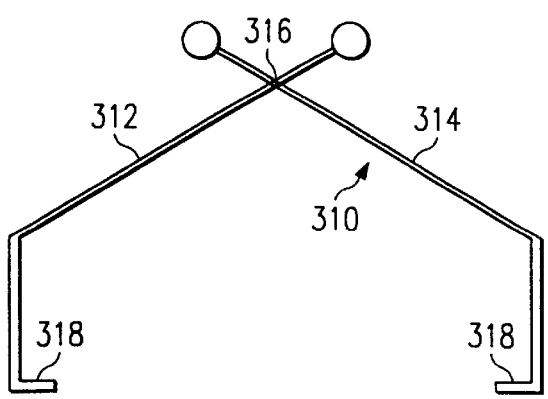
FIG. 23 is an end view of a removable handle used to grasp the device.

With reference to FIG. 23, a removable handle 310 can be employed to assist in placing and removing the device 10 and other devices described herein. The handle 310 includes a first arm 312, and a second arm 314 connected together by a pivot 316. Each arm has an in turned lip 318 to pass around the bottom of the body of the device to allow the device to be moved.

Although the present invention and its advantages have been described in detail herein, it should be understood that various changes, substitutions and modifications of parts and elements can be made without departing from the spirit and scope of the invention as defined by the appended claims.

I claim:

1. A method for rapidly changing the temperature of a mass of product, comprising the steps of:

placing a plurality of input heat transfer elements within the mass of product; and exposing a plurality of output heat transfer elements in thermal contact with the plurality of input heat transfer elements to an ambient temperature environment to transfer thermal energy between the product mass and ambient temperature environment, heat flow being equally effective from the input heat transfer elements to the output heat transfer elements as from the output heat transfer elements to the input heat transfer elements to allow equally effective cooling or heating of the product mass.

2. The method of claim 1 further comprising the step of inserting a plurality of said input heat transfer elements within the product simultaneously.

3. A method for rapidly changing the temperature of a mass of product, comprising the steps of:

placing a plurality of input heat transfer elements within the mass of product;

exposing a plurality of output heat transfer elements in thermal contact with the plurality of input heat transfer elements to an ambient temperature environment to transfer thermal energy between the product mass and ambient temperature environment; and removing said plurality of input heat transfer elements from said plurality of output heat transfer elements to facilitate cleaning.

4. The method of claim 1 further comprising the step of inserting said plurality of input heat transfer elements through a slot formed in a lid for a pan containing the mass of product to insert said plurality of input heat transfer elements into the mass of product.

5. The method of claim 1 further comprising the step of passing a heat transfer medium through a hollow interior of said plurality of input heat transfer elements to transfer heat to the heat transfer medium.

6. The method of claim 1 further comprising the step of grasping the plurality of input heat transfer heat elements with a removable handle.

7. The method of claim 1 wherein the step of placing said plurality of input heat transfer elements within the mass of product includes the step of placing the plurality of input heat transfer elements within a mass of food.

8. The method of claim 1 further comprising a step of providing a visual indication when the at least one input heat transfer element has achieved a predetermined temperature.

9. The method of claim 1 further comprising the step of orienting said plurality of input heat transfer elements and said plurality of output heat transfer elements generally parallel the direction of insertion of the plurality of input heat transfer elements within the mass of product.

10. The method of claim 1 wherein the plurality of input heat transfer elements are hollow, forming chambers, the chambers being connected by a manifold, the step of placing the plurality of input heat transfer elements within the mass of product further comprising the step of permitting circulation of a thermal transfer medium between the chambers and manifold.

11. The method of claim 1 wherein the step of placing a plurality of heat transfer elements within the mass of product includes the step of placing a plurality of input heat transfer elements formed of a coated heat conductive material within the mass of product so that the mass of product contacts the coating.

12. A method for rapidly changing the temperature of a mass of pre-cooked food, comprising the steps of:

placing at least one input heat transfer element within the mass of pre-cooked food; and exposing at least one output heat transfer element in thermal contact with the at least one input heat transfer element to an ambient temperature environment to transfer thermal energy between the food and the ambient temperature environment so that the temperature of the food is changed 100 degrees F. within four hours, heat flow being equally effective from the input heat transfer element to the output heat transfer element as from the output heat transfer element to the input heat transfer element to allow equally effective cooling or heating of the food mass.

13. The method of claim 12 wherein the food is cooled from 140 degrees F. to 40 degrees within four hours.

14. The method of claim 13 wherein the food is cooled from 140 degrees F. to 70 degrees F. within two hours and cooled from 70 degrees F. to 40 degrees F. within two additional hours.

15. The method of claim 12 wherein the food is heated from 40° F. to at least 160° F. within one hour.

\* \* \* \* \*